US005108621A

United States Patent [19]

Robins

[11] Patent Number: 5,108,621

[45] Date of Patent: Apr. 28, 1992

[54] METHOD OF NEUTRALIZING HAZARDOUS PRODUCTS

[76] Inventor: Edward W. Robins, 5562 Alpine, Côte St-Luc, Montreal, Quebec, Canada, H4V 2X3

[21] Appl. No.: 660,057

[22] Filed: Feb. 25, 1991

[30] Foreign Application Priority Data

Jan. 22, 1991 [CA] Canada ................................ 2034746

[51] Int. Cl.$^5$ ................................ C02F 1/58

[52] U.S. Cl. ................................ 210/728; 210/729; 210/751; 210/908

[58] Field of Search ................................ 210/723-730, 210/749, 751, 908, 909

[56] References Cited

U.S. PATENT DOCUMENTS

| | | | |
|---|---|---|---|
| 3,340,212 | 9/1967 | Tomita | 260/22 |
| 3,689,463 | 9/1972 | Krugilkov et al. | 260/70 A |
| 3,714,124 | 1/1973 | Hunsucker | 260/70 A |
| 3,716,483 | 2/1973 | Renner | 210/40 |
| 3,869,387 | 3/1975 | Vargiu et al. | 210/725 |
| 3,883,462 | 5/1975 | Pearson | 260/849 |
| 4,009,996 | 3/1977 | Würmli | 8/94.21 |
| 4,064,220 | 12/1977 | Alon | 210/729 |
| 4,081,366 | 3/1978 | O'Donnell | 210/725 |
| 4,243,797 | 1/1981 | Petersen et al. | 210/908 |
| 4,338,196 | 7/1982 | Mayerle | 210/908 |
| 4,340,490 | 7/1982 | Junkermann et al. | 210/759 |
| 4,454,048 | 6/1984 | Brunbeck et al. | 210/726 |
| 4,518,508 | 5/1985 | Conner | 210/751 |
| 4,663,379 | 5/1987 | Fischer et al. | 524/376 |
| 4,757,108 | 7/1988 | Walisser | 524/596 |
| 4,855,053 | 8/1989 | Benedetti et al. | 210/908 |
| 4,901,410 | 2/1990 | Fischer et al. | 27/21.1 |
| 4,909,947 | 3/1990 | Johnson et al. | 210/737 |
| 4,931,192 | 6/1990 | Covington et al. | 210/751 |

FOREIGN PATENT DOCUMENTS 1540926 8/1968 France .

*Primary Examiner*—Thomas Wyse

[57] ABSTRACT

Treating formaldehyde or formaldehyde containing solutions which are used for tissue fixation, for providing biological sample preservatives and the like to permit a readily available disposal of formaldehyde by dumping or for external treatment without harming the environment. Formaldehyde or solutions thereof are contacted with a composition containing urea, phosphoric acid or ammonium chloride and water, they are allowed to be neutralized by the composition and the reaction product can readily be disposed.

5 Claims, No Drawings

METHOD OF NEUTRALIZING HAZARDOUS PRODUCTS

BACKGROUND OF INVENTION (a) Field of the Invention

The present invention relates to a method of neutralizing hazardous products and a composition therefor. More particularly, the present invention is concerned with a method for the treatment of formaldehyde and formaldehyde bearing solutions, particularly those which are used such as in hospital laboratories, medical and veterinary research and testing laboratories and mortuaries, for tissue fixation, for providing biological sample preservatives, and the like to render the solutions readily disposable for dumping and for external treatment without harming the environment.

(b) Description of Prior Art

The reaction of urea with formaldehyde to provide a copolymer and the resultant neutralization of formaldehyde has been known for a long time. As a matter of fact, any skilled chemist would know that this reaction was one of the first to be disclosed in the field of polymer chemistry. It would therefore be normal to expect that each time formaldehyde becomes a problem, urea would be used to offset the possibly harmful effects of formaldehyde. For example, it is well known that in a chemical plant, or in a laboratory, a formaldehyde spill which cannot be otherwise disposed of, may be treated with urea to at least partially neutralize its effects. While the use of formaldehyde is essential for tissue preservation, the discharge of formaldehyde bearing wastes however, is looked upon as damaging to the environment. Formaldehyde users are normally forced to employ waste management companies to deal with the disposal problem.

However, to the knowledge of the applicant, in the case of large amounts of formaldehyde or formaldehyde bearing solutions, no proposal has been advanced to safely, efficiently and economically handle these products without harming the environment. This is particularly the case of hospitals, medical and veterinary research laboratories and mortuaries where large quantities of formaldehyde must consistently be removed from the site to locations where little or no problem to the environment would be caused.

The prior art discloses the following references, none of which even comes close to suggesting a practical solution to the problem discussed above:

United States Patents 3,340,212
4,454,048
3,689,463
4,518,508
3,714,124
4,663,379
3,716,483
4,757,108
3,883,462
4,855,053
4,009,996
4,901,410
4,243,797
4,909,947
4,338,196
4,931,192

4,340,490

French Patent 1,540,926

SUMMARY OF INVENTION

It is an object of the present invention to provide a simple efficient and economical means for the disposal of formaldehyde and formaldehyde bearing solutions.

It is another object of the invention to provide a method for the disposal of formaldehyde containing material which is safe for the environment.

It is another object of the present invention to provide a composition which can be used for the safe disposal of formaldehyde and formaldehyde bearing solutions, particularly those which are used in hospital laboratories, medical and veterinary research and testing laboratories, and mortuaries.

In accordance with the present invention, there is provided a method of treatment of formaldehyde and formaldehyde bearing solutions which are used for tissue fixation, for providing biological sample preservatives and the like to render said formaldehyde and formaldehyde bearing solutions readily disposable for dumping or for external treatment without harming the environment, which comprises contacting said formaldehyde or formaldehyde bearing solution with a composition comprising about 30 to about 55 weight percent urea, about 3 to about 12 weight percent of a product selected from the group consisting of phosphoric acid and ammonium chloride, the balance consisting of water, allowing substantially all the formaldehyde or formaldehyde bearing solution to be neutralized by the composition to give a reaction product, and disposing of the reaction product.

DESCRIPTION OF PREFERRED EMBODIMENTS

In accordance with a preferred embodiment of the invention, the composition comprises about 30 to about 50 weight percent urea, about 5 to about 12 weight percent ammonium chloride, the balance consisting of water, most preferably about 40 weight percent urea and about 8 weight percent ammonium chloride.

In accordance with another preferred embodiment of the invention, the composition comprises about 40 to about 55 weight percent urea, about 3.5 to about 7 weight percent phosphoric acid, the balance consisting of water, most preferably and 50 weight percent urea and about 4.3 weight percent phosphoric acid.

The product which results from the treatment according to the invention, is an inert powder residue which is environmentally harmless and safe for disposed such as into a normal sewer system.

EXAMPLE

DAILY DISPOSAL SYSTEM

For the daily neutralization of formaldehyde solutions in regular use, the following procedure should be followed:

a) Calculate the lab's daily formaldehyde solution waste generated.

b) A covered plastic reservoir is filled a sufficient amount of a composition according to the invention containing 55 weight percent urea, 4.3 weight percent $H_3PO_4$, and water to neutralize the maximum daily formaldehyde waste generated by the lab. The following table shows the required quantities.

| Per liter of | Formaldehyde Content % | Amount of composition required* |
|---|---|---|
| 1- Formaldehyde 37% | 37% | 1.7 lts |
| 2- Fixative solutions 4% with acid, sulphate alcohol buffer | 4% | 275 ml. |
| 3- Fixative solutions 10% with acid, phosphate buffers | 10% | 550 ml. |
| 4- Fixative solutions 6% with acid/phosphate buffers | 6% | 385 ml. |
| 5- Formalin 10% with | 4% | 275 ml. |

*Includes a 10 percent safety margin against excess formaldehyde content. The reservoir is sized to hold a minimum of 50 liters.

As waste formaldehyde solutions are generated, they are disposed of directly into the reservoir. The neutralization occurs immediately and a fine inert powdered residue settles at the bottom of the container. The reservoir is kept covered unless open to deposit waste solution. At the end of the day, the contents of the reservoir are stirred and allowed to stand for 15 minutes to assure that all formaldehyde has been neutralized.

The inert powder residue is environmentally harmless and safe to dispose of into the sewer system. The reservoir can be moved from the lab and washed with water. Once rinsed, the container can be reused.

Tests made with compositions containing various ranges of urea and phosphoric acid, and substituting ammonium chloride for phosphoric acid, within the ranges specified above, gave equivalent results.

It is understood that modifications can be made without departing from the spirit of the invention, provided the composition falls within the scope of the appended claims.

I claim:

1. Method of treatment of formaldehyde and formaldehyde bearing solutions which are used for tissue fixation, for providing biological sample preservatives and the like to render said formaldehyde and formaldehyde bearing solutions readily disposable for dumping or for external treatment without harming the environment which comprises contacting said formaldehyde or formaldehyde bearing solution with a composition comprising about 30 to about 55 weight percent urea, about 3 to about 12 weight percent of a product selected from the group consisting of phosphoric acid and ammonium chloride, the balance consisting of water, allowing substantially all said formaldehyde or formaldehyde bearing solution to be neutralized by said composition to give a reaction product, and disposing of said reaction product.

2. Method according to claim 1, wherein said composition comprises about 30 to about 50 weight percent urea, about 5 to about 12 weight percent ammonium chloride, the balance consisting of water.

3. Method according to claim 2, wherein said composition comprises about 40 weight percent urea, about 8 weight percent ammonium chloride, the balance consisting of water.

4. Method according to claim 1, wherein said composition comprises about 40 to about 55 weight percent urea, about 3.5 to about 7 weight percent phosphoric acid, the balance consisting of water.

5. Method according to claim 1, wherein said composition comprises about 50 weight percent urea, about 4.3 weight percent phosphoric acid, the balance consisting of water.

* * * * *